United States Patent [19]

Weber et al.

[11] Patent Number: 5,783,634
[45] Date of Patent: Jul. 21, 1998

[54] THERMOPLASTIC MOLDING MATERIALS BASED ON PARTLY AROMATIC COPOLYAMIDES AND POLYCARBONATES

[75] Inventors: Martin Weber, Neustadt; Herbert Fisch, Wachenheim; Gunter Pipper, Bad Dürkheim; Axel Gottschalk, Neustadt, all of Germany

[73] Assignee: BASF Aktiengesellschaft, Ludwigshafen, Germany

[21] Appl. No.: 815,915

[22] Filed: Mar. 13, 1997

Related U.S. Application Data

[63] Continuation of Ser. No. 635,001, Apr. 19, 1996, abandoned.

[51] Int. Cl.$^6$ .................................................. C08F 8/30
[52] U.S. Cl. ............................ 525/133; 525/178; 525/179
[58] Field of Search .................................. 525/133, 178, 525/179

[56] References Cited

U.S. PATENT DOCUMENTS

| | | | |
|---|---|---|---|
| 4,603,166 | 7/1986 | Poppe et al. | 524/606 |
| 4,782,117 | 11/1988 | Lausberg et al. | 525/146 |
| 5,126,428 | 6/1992 | Freitag et al. | 528/196 |
| 5,137,688 | 8/1992 | DeRudder | 422/22 |
| 5,244,970 | 9/1993 | Kobayashi et al. | 525/63 |

FOREIGN PATENT DOCUMENTS

| | | |
|---|---|---|
| 422 441 | 4/1991 | European Pat. Off. |
| 42 11 061 | 4/1992 | Germany. |
| 55-142049 | 4/1979 | Japan. |
| 62-273251 | 5/1986 | Japan. |

*Primary Examiner*—Helen L. Pezzuto
*Attorney, Agent, or Firm*—Keil & Weinkauf

[57] ABSTRACT

Thermoplastic molding materials contain

A) from 1 to 99% by weight of a partly aromatic copolyamide composed of
  $a_1$) from 30 to 44 mol % of units which are derived from terephthalic acid,
  $a_2$) from 6 to 25 mol % of units which are derived from isophthalic acid,
  $a_3$) from 43 to 49.5 mol % of units which are derived from hexamethylenediamine and
  $a_4$) from 0.5 to 7 mol % of units which are derived from aliphatic cyclic diamines of 6 to 30 carbon atoms,
  the molar percentages of components $a_1$) to $a_4$) together giving 100%,
B) from 1 to 99% by weight of an aromatic polycarbonate,
C) from 0 to 30% by weight of a polymeric component having OH groups,
D) from 0 to 60% by weight of fibrous or particulate fillers or of a mixture thereof,
E) from 0 to 40% by weight of rubber impact modifiers and
F) from 0 to 40% by weight of conventional additives and processing assistants.

19 Claims, No Drawings

THERMOPLASTIC MOLDING MATERIALS BASED ON PARTLY AROMATIC COPOLYAMIDES AND POLYCARBONATES

This application is a continuation of application Ser. No. 08/635,001, filed on Apr. 19, 1996, now abandoned.

The present invention relates to thermoplastic molding materials containing

A) from 1 to 99% by weight of a partly aromatic copolyamide composed of $a_1$) from 30 to 44 mol % of units which are derived from terephthalic acid, $a_2$) from 6 to 25 mol % of units which are derived from isophthalic acid, $a_3$) from 43 to 49.5 mol % of units which are derived from hexamethylenediamine and $a_4$) from 0.5 to 7 mol % of units which are derived from aliphatic cyclic diamines of 6 to 30 carbon atoms, the molar percentages of components $a_1$) to $a_4$) together giving 100%, B) from 1 to 99% by weight of an aromatic polycarbonate, C) from 0 to 30% by weight of a polymeric component having OH groups, D) from 0 to 60% by weight of fibrous or particulate fillers or of a mixture thereof, E) from 0 to 40% by weight of rubber impact modifiers and F) from 0 to 40% by weight of conventional additives and processing assistants.

The present invention furthermore relates to the use of such thermoplastic molding materials for the production of fibers, films and moldings and to the fibers, films and moldings themselves which are obtainable in this manner.

Polymer blends comprising polyamides and polycarbonates are described in a number of publications.

Blends of partly aromatic copolyamides and polycarbonates were disclosed in JP-A 5 5142 049. The partly aromatic copolyamides are obtained by polymerizing a mixture of equimolar amounts of cycloaliphatic diamines and benzenedicarboxylic acids and from 20 to 95% by weight, based on this mixture, of ω-aminocarboxylic acids or of lactams thereof.

Blends of partly aromatic copolyamides and polycarbonates were furthermore disclosed in JP-A 6 2273 251. The former contain from 60 to 100% by weight of units which are composed of aliphatic diamines and isophthalic acid or terephthalic acid or mixtures of these acids. This publication revealed that the decrease in the molecular weight and in the strength of the polycarbonate component can be avoided by controlling the moisture content of the partly aromatic copolyamides.

Owing to the high moisture absorption of the copolyamides, the molding materials known to date cannot however be used at over 100° C. in many areas, since their rigidity and strength are too low at these temperatures.

It is an object of the present invention to provide molding materials which are based on partly aromatic copolyamides and polycarbonates and have good mechanical properties, in particular high rigidity, even at elevated temperatures.

We have found that this object is achieved by the molding materials defined at the outset.

Preferred molding materials of this type are described in the subclaims and the description below.

Component A

The novel molding materials contain, as component A, from 1 to 99, preferably from 5 to 95, in particular from 10 to 77, % by weight of a partly aromatic copolyamide, ie. of a copolyamide which is partly composed of monomers which contain an aromatic ring.

According to the invention, the partly aromatic copolyamides are composed of $a_1$) from 30 to 44, preferably from 32 to 40, in particular from 32 bis 38, mol % of units which are derived from terephthalic acid, $a_2$) from 6 to 25, preferably from 10 to 21, in particular from 12 to 18, mol % of units which are derived from isophthalic acid, $a_3$) from 43 to 49.5, preferably from 46 to 48.5, in particular from 46.3 to 48.2, mol % of units which are derived from hexamethylenediamine, $a_4$) from 0.5 to 7, preferably from 1.5 to 4, in particular from 1.8 to 3.7, mol % of units which are derived from aliphatic cyclic diamines of 6 to 30, preferably 13 to 29, in particular 13 to 17, carbon atoms, the molar percentages of components $a_1$) to $a_4$) together giving 100%.

The diamine units $a_3$) and $a_4$) are preferably reacted in roughly equimolar amounts with the dicarboxylic acid units $a_1$) and $a_2$).

Suitable monomers $a_4$) are preferably cyclic diamines of the formula I

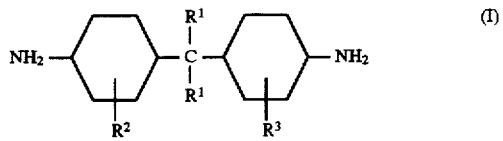

where $R^1$ is hydrogen or $C_1$–$C_4$-alkyl and $R^2$ and $R^3$ are each $C_1$–$C_4$-alkyl or hydrogen.

Particularly preferred diamines $a_4$) are bis(4-aminocyclohexyl)-methane, bis(4-amino-3-methylcyclohexyl)methane, 2,2-bis(4-aminocyclohexyl)propane and 2,2-bis(4-amino-3-methylcyclohexyl)propane.

Examples of further monomers $a_4$) are 1,3- and 1,4-cyclohexanediamine and isophoronediamine.

In addition to the units $a_1$) to $a_4$) described above, the partly aromatic copolyamides may contain up to 20, preferably up to 10, in particular up to 4, % by weight of further polyamide-forming monomers $a_5$), as are known from other polyamides.

Aromatic dicarboxylic acids as component $a_5$) are in general of 8 to 16 carbon atoms. Examples of suitable aromatic dicarboxylic acids are substituted terephthalic and isophthalic acids, such as 3-tert-butylisophthalic acid, polynuclear dicarboxylic acids, eg. 4,4'- and 3,3'-diphenyldicarboxylic acid, 4,4'- and 3,3'-diphenylmethanedicarboxylic acid, 4,4'- and 3,3'-dicarboxydiphenyl sulfone, 1,4- and 2,6-naphthalenedicarboxylic acid and phenoxyterephthalic acid.

Further polyamide-forming monomers $a_5$) may be derived from dicarboxylic acids of 4 to 16 carbon atoms and aliphatic diamines of 4 to 16 carbon atoms and from aminocarboxylic acids or corresponding lactams of 7 to 12 carbon atoms. As merely a few examples of suitable monomers of these types, suberic acid, azelaic acid and sebacic acid may be mentioned as typical aliphatic dicarboxylic acids, 1,4-butanediamine, 1,5-pentanediamine and piperazine as typical diamines and caprolactam, capryllactam, enantholactam, ω-aminoundecanoic acid and laurolactam as typical lactams and aminocarboxylic acids.

Other partly aromatic copolyamides which have proven particularly advantageous are those whose triamine content is less than 0.5, preferably less than 0.3, % by weight.

Partly aromatic copolyamides prepared by most known processes (cf. U.S. Pat. No. 4,603,166) have triamine contents which are above 0.5% by weight, which leads to a deterioration in the product quality and to problems in the continuous preparation. A particular triamine which causes these problems is dihexamethylenetriamine, which is formed from the hexamethylenediamine used in the preparation.

Copolyamides having a low triamine content have, with the same solution viscosity, lower melt viscosities compared with products of the same composition which have a higher triamine content. This considerably improves both the processibility and the product properties.

The melting points of the last-mentioned partly aromatic copolyamides are in general from 290° to 340° C., preferably from 292 to 330° C., this melting point: being associated with a high glass transition temperature of, as a rule, more than 120° C., in particular more than 130° C. (in the dry state).

The partly aromatic copolaymides preferably have a crystallinity of >30%, preferably >35%, in particular >40%.

The crystallinity is a measure of the proportion of crystalline fragments in the copolyamide and is determined by X-ray diffraction or indirectly by measuring $\Delta H_{cryst}$.

Of course, mixtures of different partly aromatic copolyamides may also be used, any desired mixing ratio being possible.

Suitable processes for the preparation of partly aromatic copolyamides which can be used according to the invention are known to a person skilled in the art.

A preferred method of preparation is the batch process. Here, the aqueous monomer solution is heated to 280°–340° C. in the course of from 0.5 to 3 hours in an autoclave, the resulting pressure of from 10 to 50, in particular from 15 to 40, bar being kept very constant for up to 2 hours by releasing excess steam. The autoclave is then let down at constant temperature in the course of from 0.5 to 2 hours until a final pressure of from 1 to 5 bar is reached. The polymer melt is then discharged, cooled and granulated.

Another preferred process is carried out similarly to the processes described in EP-A 129 195 and 129 196.

In these processes, an aqueous solution of the monomers $a_1$) to $a_4$) and, if required, $a_5$), having a monomer content of from 30 to 70, preferably from 40 to 65, % by weight is heated to 280°–330° C. in the course of less than 60 seconds under superatmospheric pressure (from 1 to 10 bar) and with simultaneous evaporation of water and formation of a prepolymer, prepolymer and steam are then separated continuously, the steam is rectified and the entrained diamines are recycled. Finally, the prepolymer is passed into a polycondensation zone and subjected to polycondensation under superatmospheric pressure of from 1 to 10 bar and at from 280° to 330° C. in a residence time of from 5 to 30 minutes. Of course, the temperature in the reactor is above the melting point of the resulting prepolymer at the particular steam pressure.

As a result of these short residence times, the formation of triamines is substantially prevented.

The resulting polyamide prepolymer, which as a rule has a viscosity number of from 40 to 70, preferably from 40 to 60, ml/g, measured in a 0.5% strength by weight solution in 96% strength sulfuric acid at 25° C., is removed continuously from the condensation zone.

In a preferred procedure, the polyamide prepolymer thus obtained is passed in molten form through a discharge zone with simultaneous removal of the residual water contained in the melt. Examples of suitable discharge zones are devolatilization extruders. The melt freed in this manner from the water is then extruded and the extrudate is granulated.

These granules are subjected to continuous or batchwise solid-phase condensation under an inert gas at below the melting point, for example from 170° to 240° C., until the desired viscosity is obtained. For example, tumble dryers can be used for the batchwise solid-phase condensation, and heating tubes through which hot inert gas flows may be employed for the continuous solid-phase condensation. The continuous solid-phase condensation is preferred, the inert gas being nitrogen or in particular superheated steam, advantageously the steam obtained at the top of the column.

The viscosity number after the solid-phase postcondensation or the other abovementioned preparation processes is in general from 100 to 500, preferably from 110 to 200, ml/g, measured in a 0.5% strength by weight solution in 96% strength sulfuric acid at 25° C.

Component B

The novel thermoplastic molding materials contain, as component B, from 1 to 99, preferably from 5 to 93, in particular from 10 to 77, % by weight of at least one polycarbonate.

Examples of suitable polycarbonates are those based on diphenols of the general formula II

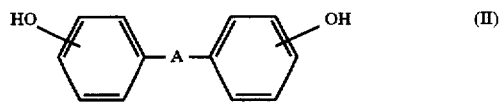

where A is a single bond, $C_1$–$C_3$-alkylene, $C_2$- or $C_3$-alkylidene, $C_3$–$C_6$-cycloalkylidene, —S— or —SO$_2$—.

Examples of preferred diphenols of the formula II are 4,4'-dihydroxydiphenyl, 2,2-bis(4-hydroxyphenyl)propane, 2,4-bis(4-hydroxyphenyl)-2-methylbutane and 1,1-bis(4-hydroxyphenyl)cyclohexane. 2,2-bis(4-Hydroxyphenyl)propane (bisphenol A) and 1,1-bis(4-hydroxyphenyl)cyclohexane are particularly preferred. However, the preferred diphenols also include unsubstituted and substituted cyclohexylbisphenols. Among these, trimethylcyclohexylbisphenol A of the formula

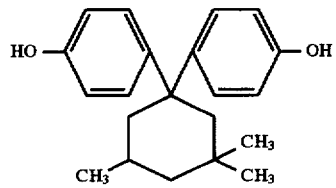

is particularly preferred.

Both homopolycarbonates and copolycarbonates are suitable as component B, the copolycarbonates of bisphenol A being preferred in addition to the bisphenol A homopolymer.

The suitable polycarbonates may be branched in a known manner, preferably by the incorporation of from 0.05 to 2.0 mol %, based on the sum of the diphenols used, of at least trifunctional compounds, for example those having three or more phenolic OH groups.

Furthermore, the polycarbonates which are suitable as component B may be monosubstituted to trisubstituted on the aromatic units by halogen, preferably by chlorine and/or bromine. However, halogen-free compounds are particularly preferred.

Particularly preferably used polycarbonates are those which have relative viscosities $\eta_{rel}$ of from 1.10 to 1.50, in particular from 1.25 to 1.40 (measured in each case in 0.5% strength by weight solution in dichloromethane). This corresponds to weight average molecular weights $M_w$ of from 10,000 to 200,000, preferably from 20,000 to 80,000.

The diphenols of the general formula II are known per se or can be prepared by known processes.

The polycarbonates can be prepared, for example, by reacting the diphenols with phosgene by the phase boundary method or with phosgene by the method in homogeneous phase (the pyridine method), the molecular weight to be established in each case being obtained in a known manner by means of an appropriate amount of known chain terminators. (Refer to, for example, German Laid-Open Application DOS 3,334,782 with regard to polydiorganosiloxane-containing polycarbonates.)

Examples of suitable chain terminators are phenol and p-tert-butylphenol, as well as long-chain alkylphenols, such as 4-(1,3-tetramethylbutyl)phenol, according to German Laid-Open Application DOS 2,842,005, or monoalkylphenols and dialkylphenols where the alkyl substituents have a total of 8 to 20 carbon atoms, according to DE-A 35 06 472, for example p-nonylphenyl, 3,5-di-tert-butylphenol, p-tert-octylphenol, p-dodecylphenol, 2-(3,5-dimethylheptyl)phenol and 4-(3,5-dimethylheptyl)phenol.

Further suitable polycarbonates are those based on hydroquinone or resorcinol.

Component C

The novel molding materials contain, as component C, a polymeric component having hydroxyl groups. The proportion of component C in the novel molding materials is from 0 to 30% by weight, based on the total weight of the components A to E, and depends on the compatibility of the base polymer with the components A and B. In general, proportions of from 2 to 20, in particular from 3 to 15, % by weight have proven particularly advantageous.

The experiments carried out showed that in principle any group having proton donor properties should be suitable as component C, but that groups containing the structural unit —OH are particularly suitable. Component C has a compatibility-improving effect. This is very probably based on the fact that interactions, for example H bridge bonds, occur between the component C and the components A and B and result in better interphase adhesion.

As stated above, in principle all polymers having hydroxyl groups which are essentially freely available are suitable. Of course, it is necessary to ensure that the components A and B are stable with respect to component C. This should be borne in mind particularly when compounds having acidic —OH groups are used.

On the basis of these preconditions, some groups of compounds have proven particularly advantageous and are described below. However, it is possible in principle also to use other components C, provided that the stability of the components A and B does not suffer as a result.

The first group of particularly suitable polymers comprises polycondensates of aliphatic or aromatic diols or alcohols having a higher functionality with epihalohydrins. Such compounds and processes for their preparation are known per se to a person skilled in the art, and therefore further information is unnecessary here. In principle, aliphatic or aromatic diols are suitable. Particularly preferred dihydroxy compounds are the diols used for the preparation of polycarbonates.

Because it is readily obtainable, a polycondensate of bisphenol A and epichlorohydrin having the structure

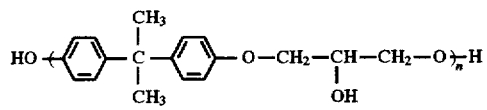

is preferably used.

In addition to the possibility of using polymers which already have the hydroxyl group in the main chain, it is also possible to use polymers or copolymers which acquire these functional groups as a result of the presence of suitable monomers in the polymerization, in which case the groups in the polymers may be present likewise in the main chain but also in substituents of the main chain. A further possibility comprises grafting suitable monomers having OH groups onto grafting bases, in principle all polymers which are not completely incompatible with components A and B being suitable as grafting bases. A certain degree of incompatibility can be compensated by increasing the proportion of the hydroxyl groups.

Suitable components C are therefore, for example, polymers based on polyolefins, polystyrene and rubber elastomers which have hydroxyl groups —OH which are obtainable either by using suitable comonomers or by grafting on the functional groups —OH. The proportion of comonomers or graft monomers having hydroxyl groups —OH is dependent on the degree of compatibility of the base polymer with the components A and B. The better the compatibility, the smaller may the proportion of OH groups be. From the above, it is evident that a large number of polymers are suitable as component C, of which some particularly preferred types are described in more detail below merely by way of example.

The first group comprises polymers and copolymers containing up to 100 mol % of vinylphenylcarbinols, vinylphenyldimethylcarbinols and in particular vinylphenylhexafluorodimethylcarbinol having proven particularly suitable. The abovementioned types of polymers are in turn advantageous as the base polymer or grafting base.

A second group which may be mentioned comprises the polymers and copolymers of this group with vinylphenols, which may also contain substituents in the nucleus. Substituents which increase the acidity of the phenolic hydrogen are particularly suitable, for example halogen substituents, but also other electron-attracting substituents.

A third group which may be mentioned comprises the phenol/formaldehyde polycondensates, provided that they are uncrosslinked and soluble. These products may be linear or branched.

In principle, polymers and copolymers with all polymerizable or graftable alcohols may also be mentioned.

It should be mentioned that polymers which have hydroxyl groups and are based on polyamides are particularly preferred, since in this case the compatibility with component A exists from the outset so the proportion of OH groups can be reduced.

Component C can be prepared by conventional polycondensation or graft polymerization or copolymerization methods, and further information is therefore unnecessary here.

Component D

In addition to the components A, B and C, the novel molding materials may also contain further reinforcing materials or fillers; the amount of these substances may be up to 60, preferably up to 45, and in particular from 10 to 40, % by weight.

Suitable particulate fillers are amorphous silica, magnesium carbonate (chalk), powdered quartz, mica, talc, feldspar, glass beads and in particular calcium silicates, such as wollastonite and kaolin (in particular calcined kaolin), and carbon black.

Examples of fibrous reinforcing materials are potassium titanate whiskers, aramid fibers and in particular glass fibers. When glass fibers are used, they may be provided with a size and with an adhesion promoter in order to ensure better compatibility with the matrix material.

The glass fibers may be incorporated both in the form of short glass fibers and in the form of rovings. In the finished injection molding, the average length of the glass fibers is preferably from 0.04 to 0.5 mm.

Preferred combinations of fillers are, for example, from 5 to 30% by weight of wollastonite or talc with from 1 to 10% by weight of glass fibers.

Component E

In addition to components A to D, the novel molding materials may also contain up to 40, preferably up to 25, % by weight of a rubber impact modifier E.

Preferred elastomeric polymers are polymers which are based on olefins and are composed of the following components:

$e_1$) from 40 to 100% by weight of at least one α-olefin of 2 to 8 carbon atoms, $e_2$) from 0 to 50% by weight of a diene, $e_3$) from 0 to 45% by weight of a $C_1$-$C_{12}$-alkyl ester of acrylic acid or methacrylic acid or a mixture of such esters, $e_4$) from 0 to 40% by weight of an ethylenically unsaturated mono- or dicarboxylic acid or a functional derivative of such an acid, $e_5$) from 0 to 40% by weight of an epoxy-containing monomer and $e_6$) from 0 to 5% by weight of other monomers capable of free radical polymerization, with the proviso that the component C is not an olefin homopolymer.

A first preferred group comprises the ethylene/propylene (EPM) and ethylene/propylene/diene (EPDM) rubbers, which preferably have a ratio of ethylene units to propylene units of from 40:60 to 90:10.

The Mooney viscosities (MLI+4/100° C.) of such, preferably uncrosslinked, EPM and EPDM rubbers (gel contents in general less than 1% by weight) are preferably from 25 to 100, in particular from 35 to 90 (measured using a large rotor after a running time of 4 minutes at 100° C. according to DIN 53 523).

EPM rubbers generally have virtually no double bonds, whereas EPDM rubbers may have from 1 to 20 double bonds per 100 carbon atoms.

Examples of diene monomers $e_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene and mixtures thereof. Hexa-1,5-diene, 5-ethylidenenorbornene and dicyclopentadiene are preferred. The diene content of the EPDM rubbers is preferably from 0.5 to 50, in particular from 2 to 20, particularly preferably from 3 to 15, % by weight, based on the total weight of the olefin polymer.

EPM and EPDM rubbers may preferably also be grafted with reactive carboxylic acids or derivatives thereof. Particular examples of these are acrylic acid, methacrylic acid and derivatives thereof and maleic anhydride.

A further group of preferred olefin polymers comprises copolymers of α-olefins having 2 to 8 carbon atoms, in particular of ethylene, with $C_1$-$C_{18}$-alkyl esters of acrylic acid and/or methacrylic acid.

In principle, all primary and secondary $C_1$-$C_{18}$-alkyl esters of acrylic acid or methacrylic acid are suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of methacrylates and acrylates $e_3$) is from 0 to 60, preferably from 10 to 50, in particular from 30 to 45, % by weight, based on the olefin polymers.

Instead of the esters $e_3$), or in addition to these, ethylenically unsaturated mono- or dicarboxylic acid monomers $e_4$) having acid functional groups and/or latent acid functional groups or epoxy-containing monomers $e_5$) may also be present in the olefin polymers.

Examples of monomers $e_4$) are acrylic acid, methacrylic acid, tertiary alkyl esters of these acids, in particular tert-butyl acrylate, and dicarboxylic acids, such as maleic acid and fumaric acid, or derivatives of these acids and the monoesters thereof.

Monomers having latent acid functional groups are to be understood as meaning those compounds which form free acid groups under the polymerization conditions or during the incorporation of the olefin polymers into the molding materials. Examples of these are anhydrides of dicarboxylic acids of up to 20 carbon atoms, in particular maleic anhydride, and tertiary $C_1$-$C_{12}$-alkyl esters of the abovementioned acids, in particular tert-butyl acrylate and tert-butyl methacrylate.

The monomers having acid functional or latent acid functional groups and the epoxy-containing monomers are preferably incorporated in the olefin polymers by adding to the monomer mixture compounds of the general formulae III–VI

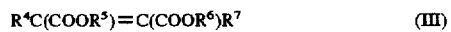

(III)

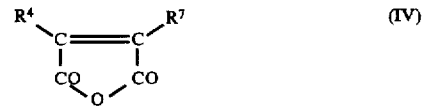

(IV)

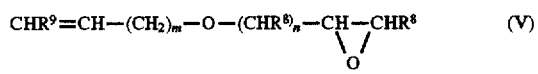

(V)

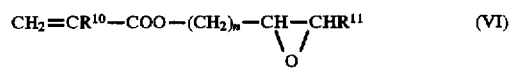

(VI)

where $R^4$–$R^{11}$ are each hydrogen or alkyl of 1 to 6 carbon atoms, m is an integer from 0 to 20 and n is an integer from 0 to 10.

$R^4$–$R^9$ are each preferably hydrogen, m is preferably 0 or 1 and n is preferably 1. The corresponding compounds are maleic acid, fumaric acid, maleic anhydride $e_4$) and alkenyl glycidyl ether or vinyl glycidyl ether $e_5$).

Preferred compounds of the formulae I, II, III and IV are maleic acid and maleic anhydride as component $e_4$) and epoxy-containing esters of acrylic acid and/or methacrylic acid, glycidyl acrylate and glycidyl methacrylate being particularly preferred (as componente $e_5$).

The amount of components $e_4$) and $e_5$) is in each case from 0.07 to 40, in particular from 0.1 to 20, particularly preferably from 0.15 to 15, % by weight, based on the total weight of the olefin polymers.

Particularly preferred olefin polymers are composed of from 50 to 98.9, in particular from 60 to 95, % by weight of ethylene, from 0.1 to 20, in particular from 0.15 to 15, % by weight of glycidyl acrylate and/or glycidyl methacrylate, acrylic acid and/or maleic anhydride, from 1 to 45, in particular from 10 to 35, % by weight of n-butyl acrylate and/or 2-ethylhexyl acrylate.

Further preferred esters of acrylic and/or methacrylic acid are the methyl, ethyl, propyl and isobutyl esters.

Examples of suitable other monomers $e_6$) are vinyl esters and vinyl ethers.

The preparation of the ethylene copolymers described above can be carried out by processes known per se, preferably by random copolymerization under high pressure and at elevated temeprature.

The melt flow index of the ethylene copolymers is in general from 35 1 to 80 g/10 min (measured at 190° C. and 2.16 kg load).

For example, emulsion polymers, whose preparation is described, for example, in Houben-Weyl, Methoden der organischen Chemie, volume XII. I (1961), and by Blackley in the monograph Emulsion Polymerization, are suitable as elastomers E, in addition to the above preferred elastomeric polymers based on olefins.

In principle, random elastomers or those having a core-shell morphology may be used. The core-shell morphology is determined by the order of addition of the individual monomers.

Examples of monomers for the preparation of the elastomers are acrylates, such as n-butyl acrylate and 2-ethylhexyl acrylate, corresponding methacrylates and mixtures thereof. These monomers may be copolymerized with further monomers, such as styrene, acrylonitrile, vinyl ethers and further acrylates or methacrylates, such as methyl methacrylate, methyl acrylate, ethyl acrylate and propyl acrylate.

It is advantageous to use emulsion polymers which have reactive groups at the surface. Such groups are, for example, epoxy, carboxyl, latent carboxyl, amino and amido groups.

The graft monomers described in EP-A 208 187 are also suitable for introducing reactive groups at the surface.

The emulsion polymers may furthermore be completely or partially crosslinked. Crosslinking monomers are, for example, buta-1,3-diene, divinylbenzene, diallyl phthalate and dihydrodicyclopentadienyl acrylate and the compounds described in EP-A 50 265.

Graft-linking monomers may also be used, ie. monomers having two or more polymerizable double bonds which react at different rates during the polymerization.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate and the corresponding monoallyl compounds of these dicarboxylic acids. In addition, there are a large number of further suitable graft-linking monomers; for further details, reference may be made, for example, to U.S. Pat. No. 4,148,846.

In general, the amount of these crosslinking monomers in component E is up to 5, preferably not more than 3, % by weight, based on E.

Examples of preferred emulsion polymers are n-butyl acrylate/(meth)acrylic acid copolymers, n-butyl acrylate/glycidyl acrylate or n-butyl acrylate/glycidyl methacrylate copolymers and graft polymers having an inner core of n-butyl acrylate and an outer shell of the abovementioned copolymers.

The elastomers E described can also be prepared by other conventional processes, for example by suspension polymerization. Siloxane-based graft rubbers may also be used.

Suitable siloxane cores can be prepared, for example, starting from cyclic oligomeric octamethyltetrasiloxane or tetravinyltetramethyltetrasiloxane. These can be reacted, for example, with γ-mercaptopropylmethyldimethoxysilane in a ring-opening cationic polymerization, preferably in the presence of sulfonic acids, to give the soft siloxane cores. The siloxanes may also be crosslinked, for example by carrying out the polymerization reaction in the presence of silanes having hydrolyzable groups, such as halogen or alkoxy, eg. tetraethoxysilane, methyltrimethoxysilane or phenyltrimethoxysilane. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The hard components are derived in general from styrene, α-methylstyrene and copolymers thereof, preferred comonomers here being acrylonitrile, methacrylonitrile and methyl methacrylate.

A further group of suitable impact modifiers comprises thermoplastic polyester elastomers. Polyester elastomers are understood as meaning segmented copolyether esters which contain long-chain segments which as a rule are derived from poly(alkylene) ether glycols and short-chain segments which are derived from low molecular weight diols and dicarboxylic acids. Such products are known per se and are described in the literature, for example in U.S. Pat. No. 3,651,014. Corresponding products are also commercially available under the names Hytrel® (Du Pont), Arnitel® (Akzo) and Pelprene® (Toyobo Co. Ltd.).

Other suitable impact modifiers are thermoplastic polyurethane elastomers. Their preparation is known to a person skilled in the art.

Mixtures of different rubbers can of course also be used.

In addition to the essential components A, B and, if required, C, D and E, the novel molding materials may contain conventional additives and processing assistants F. The amount thereof is in general up to 40, preferably up to 15, % by weight, based on the total weight of the components A to E.

Conventional additives are, for example, stabilizers and antioxidants, heat stabilizers and UV stabilizers, lubricants and mold release agents, dyes and pigments and plasticizers.

Pigments and dyes are generally present in amounts of up to 4, preferably from 0.5 to 3.5, in particular from 0.5 to 3, % by weight.

The pigments for coloring thermoplastics are generally known, cf. for example R. Gächter and H. Müller, Taschenbuch der Kunststoffadditive, Carl Hanser Verlag, 1983, pages 494 to 510. A first preferred group of pigments comprises white pigments, such as zinc oxide, zinc sulfide, lead white (2 $PbCO_3 \cdot Pb(OH)_2$), lithopone, antimony white and titanium dioxide. Of the two most commonly used crystal modifications (rutile and anatase type) of titanium dioxide, in particular the rutile form is used for imparting whiteness to the novel molding materials.

Black pigments which may be used according to the invention are iron oxide black ($Fe_3O_4$), spinell black (Cu $(Cr,Fe)_2O_4$), manganese black (mixture of manganese dioxide, silica and iron oxide), cobalt black and antimony black and particularly preferably carbon black, which is generally used in the form of furnace black or gas black (in this context, cf. G. Benzing, Pigmente für Anstrichmittel, Expert-Verlag (1988), page 78 et seq.).

Inorganic colored pigments, such as chrome green, or organic colored pigments, such as azo pigments and phthalocyanines, may of course be used according to the invention for establishing specific hues. Such pigments are generally commercially available.

It may also be advantageous to use the stated pigments or dyes as a mixture, for example carbon black with copper phthalocyanines, since the color dispersion in the thermoplastic is generally facilitated.

Antioxidants and heat stabilizers which may be added to the thermoplastic materials according to the invention are, for example, halides of metals of group I of the Periodic Table, for example sodium halides, potassium halides and lithium halides, if necessary in combination with copper(I) halides, for example chlorides, bromides or iodides. The halides, in particular those of copper, may also contain electron-rich $\pi$ ligands. Examples of such copper complexes are copper halide complexes with, for example, triphenylphosphine. Zinc fluoride and zinc chloride may also be used. Furthermore, sterically hindered phenols, hydroquinones, substituted members of this group, secondary aromatic amines, if necessary in combination with phosphorus-containing acids or salts thereof, and mixtures of these compounds may be used, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Lubricants and mold release agents, which as a rule are added in amounts of up to 1% by weight of the thermoplastic material, are stearic acid, stearyl alcohol, alkyl stearates and stearamides and esters of pentaerythritol with long-chain fatty acids. Salts of calcium, of zinc or of aluminum with stearic acid and dialkyl ketones, eg. distearyl ketone, may also be used.

The novel thermoplastic molding materials can be prepared by processes known per se, by mixing the starting components in a conventional mixing apparatus, such as an extruder, a Brabender mill or a Banbury mill, or a kneader and then extruding the mixture. Usually, the extrudate is cooled and comminuted after extrusion.

The order in which the components are mixed may be varied; for example, two or, if required, three components may be premixed, but it is also possible to mix all components together.

Thorough mixing is advantageous for obtaining a very homogeneous molding material. Average mixing times of from 0.2 to 30 minutes at from 270° to 360° C. are generally required for this purpose.

The novel molding materials have high rigidity at above 100° C. and very good toughness. Moreover, the novel molding materials have improved processing shrinkages. For example, moldings, films or fibers can be produced from the novel molding materials. Owing to the stated properties, the novel molding materials are particularly suitable for the production of shaped articles for the electrical and electronics sector and vehicle and apparatus construction.

EXAMPLES

Preparation of components $A_{1-3}$ and $AV_{1-3}$

The preparation of the partly aromatic copolyamides used as component A is described in detail below, and the composition of the products is shown in Table 1. As a relative measure of the crystallinity, the specific heat of fusion $\Delta H_{cryst}$ was determined by means of differential scanning calorimetry (DSC 9900, from Du Pont) at a heating rate of 20° C./min.

Components $A_1$ and $A_3$

A 60% strength aqueous solution consisting of terephthalic acid, isophthalic acid and hexamethylenediamine or bis(4-amino-3-methylcyclohexyl)methane or bis(4-aminocyclohexyl)methane was conveyed, in the ratios stated in the Table, from a heated storage container at about 80° C. at a rate corresponding to 5 kg/hour of polyamide, by means of a metering pump, into a tubular evaporator arranged partly horizontally and partly vertically. The evaporator was heated by means of a liquid heating medium which was at 326° C., with vigorous circulation. The evaporator had a length of 3 m, a capacity of 180 ml and a heat-transfer surface of about 1300 cm². The residence time in the evaporator was 50 seconds. The prepolymer/steam mixture emerging from the evaporator was at 310° C. and was separated in a separator into steam and melt. The melt remained in the separator for a further 10 minutes and was then extruded by means of a discharge screw having a devolatilization zone, solidified in a water bath and then granulated. The separator and the evaporator zone were kept at 5 bar by a pressure regulation means which was arranged downstream of the column. The steam separated off in the separator was fed to a packed column which had about 10 theoretical plates and to which about 1 l of vapor condensate per hour was added at the top to generate a reflux. The resulting temperature at the top of the column was 152° C. The steam emerging after the relief valve was condensed and contained less than 0.05% by weight of hexamethylenediamine. An aqueous solution of hexamethylenediamine which contained 80% by weight, based in each case on polyamide produced, of hexamethylenediamine was obtained as a bottom product of the column. This solution was recycled to the starting salt solution before the entry into the evaporator by means of a pump.

After the polymer melt had emerged from the separator, the product $A_1$ had a very pale natural color and a viscosity number of 48 ml/g (measured as a 0.5% strength solution at 25° C. in 96% strength by weight $H_2SO_4$ according to DIN 53 246).

The products $A_1$ and $A_3$ had roughly equivalent amounts of carboxyl and amino terminal groups.

In the discharge extruder, the melt was then let down to atmospheric pressure in each case and underwent virtually no further condensation during a residence time of less than 1 minute.

The products were then heated batchwise in solid phase in a stationary heating tube (double-walled glass tube which was heated from the outside with oil to the required temperature and had an internal diameter of 120 mm and a length of 1000 mm and through which 120 l/min of superheated steam flowed) at 200 ° C. until the viscosity number reached 112 ml/g. The residence time was from 8 to 18 hours. In the course of this heating, the major part of the extractable residual monomers was, if required, also extracted by steam.

Component $A_2$ 2 kg of a monomer mixture corresponding to Example 1 were initially taken with 700 ml of water in a 5 l laboratory autoclave. The mixture was distributed over 5 glass tubes, each having a capacity of 800 ml. The autoclave was heated at 350° C. for 1 hour, the resulting steam pressure being kept constant after reaching 20 bar by releasing excess water. The temperature and pressure were then kept constant for a further hour. Thereafter, the autoclave was cooled to 330° C. and let down to atmospheric pressure. The heating of the autoclave was switched off, room temperature being reached after about 3 hours.

The glass tubes were removed from the autoclave and their content coarsely milled. The product obtained was subjected to solid-phase postcondensaton at 198° C. under nitrogen for 10 hours until a viscosity number of 115 ml/g was reached.

Components $AV_{1-3}$ 3 kg of a monomer mixture which gave the polymer stated in the Table were initially taken with 2500 ml of water in a 10 l laboratory autoclave. The preparation and working up were carried out as in the case of component $A_2$. After the solid-phase postcondensation under nitrogen at 196° C. (10 hours), the copolyamides had the following viscosity numbers: $AV_1$=114 ml/g, $AV_2$=112 ml/g, $AV_3$=116 ml/g Component $B_1$ A commercial polycarbonate (eg. Lexan® 161 from General Electric) was used, said polycarbonate being characterized by a viscosity number of 61.2 ml/g, measured in 0.5% strength by weight solution in dichloromethane at 23 ° C.
Component C Condensate of bisphenol A and epichlorohydrin, having a relative viscosity of 1.13, measured in a 0.5% strength by weight solution in dichloromethane at 23 ° C. (Phenoxy® from Union Carbide Corporation).
Component E Ethylene/propylene rubber grafted with 0.7% by weight of maleic anhydride and characterized by a melt flow index of 3 g/10 min, measured at 2.16 kg and 230° C. (commercial product Exxelor VA/1803 from Exxon).

TABLE 1

Composition of the partly aromatic copolyamides used

| | | Partly aromatic copolyamides | | | | | |
| --- | --- | --- | --- | --- | --- | --- | --- |
| | | according to the invention | | | for comparison | | |
| Monomers | | $A_1$ | $A_2$ | $A_3$ | $AV_1$ | $AV_2$ | $AV_3$ |
| Hexamethylene- | mol % | 48.1 | 48.1 | 48.0 | 46.2 | 49.7 | 42.7 |
| diamine | % by weight | 39.1 | 39.1 | 35.9 | 36.9 | 40.8 | 33.3 |
| Terephthalic | mol % | 32.2 | 32.2 | 40.3 | 29.5 | 32.2 | 32.2 |
| acid | % by weight | 37.5 | 37.5 | 42.2 | 34.0 | 37.8 | 35.9 |
| Isophthalic | mol % | 17.8 | 17.8 | 9.7 | 20.5 | 17.8 | 17.8 |
| acid | % by weight | 20.6 | 20.6 | 11.2 | 23.6 | 20.9 | 20.9 |
| Bis(4-amino- | mol % | 1.9 | 1.9 | — | 3.8 | 0.3 | 7.3 |
| cyclohexyl)- | % by weight | 2.8 | 2.8 | — | 5.5 | 0.45 | 10.9 |
| methane | | | | | | | |
| Bis(4-amino- | mol % | — | — | 2 | — | — | — |
| 3-methylcyclo- | % by weight | — | — | 3 | — | — | — |
| hexyl)methane | | | | | | | |
| $\Delta H_{cryst.}$ | [J/g] | 54 | 52 | 51 | 32 | 36 | 31 |

The individual components in the examples below were mixed in a twin-screw extruder at a melt temperature of from 300° to 340° C. The melt was passed through a water bath and granulated.

The dried granules were processed at from 300° to 340° C. to give tensile test bars, circular disks and standard small bars.

The rigidity (modulus of elasticity) and the elongation at break ($\epsilon_R$) of the blends were determined by a tensile test according to DIN 53 455 on dumbells at 23° C. Furthermore, the rigidity of the samples was determined at 100° C.

The shrinkage was obtained by determining the percentage deviation of injection molded test boxes from the mold dimension (length=120.0 mm).

The composition of the molding materials and the results of the tests are shown in Table 2.

TABLE 2

| Component [% by weight] | 1 | 2 | 3 | V1 | V2 | V3 | 4 | 5 | V5 | 6 | 7 |
| --- | --- | --- | --- | --- | --- | --- | --- | --- | --- | --- | --- |
| $A_1$ | 50 | — | — | — | — | — | 45 | 30 | — | 28.5 | 27 |
| $A_2$ | — | 50 | — | — | — | — | — | — | — | — | — |
| $A_3$ | — | — | 50 | — | — | — | — | — | — | — | — |
| $AV_1$ | — | — | — | 50 | — | — | — | — | 30 | — | — |
| $AV_2$ | — | — | — | — | 50 | — | — | — | — | — | — |
| $AV_3$ | — | — | — | — | — | 50 | — | — | — | — | — |
| B | 50 | 50 | 50 | 50 | 50 | 50 | 45 | 70 | 70 | 66.5 | 63 |
| C | — | — | — | — | — | — | 5 | — | — | 5 | 5 |
| E | — | — | — | — | — | — | 5 | — | — | — | 5 |
| E [N/mm²] at RT | 2800 | 2800 | 2850 | 2700 | 2700 | 2700 | 2450 | 2600 | 2550 | 2500 | 2400 |
| $\epsilon_R$ [%] | 4.3 | 4.0 | 3.9 | 2.7 | 3.2 | 3.1 | 65 | 4.7 | 3.1 | 27 | 88 |
| E [N/mm²] at 100° C. | 1600 | 1550 | 1600 | 1000 | 1150 | 1050 | 1450 | 1500 | 950 | 1450 | 1350 |
| Shrinkage [%] | 0.63 | 0.61 | 0.62 | 0.75 | 0.70 | 0.70 | 0.65 | 0.61 | 0.72 | 0.62 | 0.63 |

The results show that the desired combination of properties is only obtained by the joint use of a partly aromatic copolyamide in the claimed composition.

We claim:

1. A thermoplastic molding material containing
   A) from 1 to 99% by weight of a partly aromatic copolyamide composed of
      $a_1$) from 30 to 44 mol % of units which are derived from terephthalic acid,
      $a_2$) from 6 to 25 mol % of units which are derived from isophthalic acid,
      $a_3$) from 43 to 49.5 mol % of units which are derived from hexamethylenediamine and
      $a_4$) from 0.5 to 7 mol % of units which are derived from aliphatic cyclic diamines of 6 to 30 carbon atoms,
      the molar percentages of components $a_1$) to $a_4$) together giving 100%,
   B) from 1 to 99% by weight of an aromatic polycarbonate,
   C) from 0 to 30% by weight of a polymeric component having OH groups,
   D) from 0 to 60% by weight of fibrous or particulate fillers or of a mixture thereof,
   E) from 0 to 40% by weight of rubber impact modifiers and
   F) from 0 to 40% by weight of conventional additives and processing assistants.

2. A thermoplastic molding material as claimed in claim 1, in which the units $a_4$ of the partly aromatic copolyamides A are derived from bis(4-aminocyclohexyl)methane or bis(4-amino-3-methylcyclohexyl)methane or a mixture thereof.

3. A thermoplastic molding material as claimed in claim 1, in which from 2 to 20% by weight of component C are present.

4. A thermoplastic molding material as claimed in claim 1, containing, as component C, a polycondensate of aliphatic or aromatic polyhydric alcohols with epihalohydrins.

5. A fiber, film or molding obtainable from a thermoplastic molding material as claimed in claim 1.

6. The thermoplastic molding material of claim 1 wherein a₁) is 32.2 mol % of units which are derived from terephthalic acid, a₂) is 17.8 mol % of units which are derived from isophthalic acid a₃) is 48.1 mol % of units which are derived from hexamethylenediamine, and a₄) is 1.9 mol % of bis(4-aminocyclohexyl)methane.

7. The thermoplastic molding material of claim 1 wherein a₁) is 40.3 mol % of units which are derived from terephthalic acid, a₂) is 9.7 mol % of units which are derived from isophthalic acid a₃) is 48.0 mol % of units which are derived from hexamethylenediamine, and a₄) is 2 mol % of bis(4-amino-3-methyl-cyclohexyl) methane.

8. The thermoplastic molding material of claim 1 wherein A) is 50% by weight of the partly aromatic copolyamide and B) is 50% by weight of a polycarbonate having a viscosity number of 61.2 ml/g, measured in 0.5% strength by weight solution in dichloromethane at 23° C.

9. The thermoplastic molding material of claim 1 wherein A) is 45% by weight of the partly aromatic copolyamide, B) is 45% by weight of a polycarbonate having a viscosity number of 61.2 ml/g, measured in 0.5% strength by weight solution in dichloromethane at 23° C., C) is 5% by weight of a condensate of bisphenol A and epichlorohydrin, having a relative viscosity of 1.13, measured in a 0.5% strength by weight solution in dichloromethane at 23° C. and E) is 5% by weight of ethylene/propylene rubber grafted with 0.7% by weight of a maleic anhydride and characterized by a melt flow index of 3 g/10 min, measured at 2.16 kg and 230° C.

10. The thermoplastic molding material of claim 1 wherein A) is 30% by weight of the partly aromatic copolyamide, B) is 70% by weight of a polycarbonate having a viscosity number of 61.2 ml/g, measured in 0.5% strength by weight solution in dichloromethane at 23° C.

11. The thermoplastic molding material of claim 1 wherein A) is 28.5% by weight of the partly aromatic copolyamide and B) is 66.5% by weight of a polycarbonate having a viscosity number of 61.2 ml/g, measured in 0.5% strength by weight solution in dichloromethane at 23° C.

12. The thermoplastic molding material of claim 1 wherein A) is 27% by weight of the partly aromatic copolyamide, B) is 63% by weight of a polycarbonate having a viscosity number of 61.2 ml/g, measured in 0.5% strength by weight solution in dichloromethane at 23° C., C) is 5% by weight of a condensate of bisphenol A and epichlorohydrin, having a relative viscosity of 1.13, measured in a 0.5% strength by weight solution in dichloromethane at 23° C. and E) is 5% by weight of ethylene/propylene rubber grafted with 0.7% by weight of a maleic anhydride and characterized by a melt flow index of 3 g/10 min, measured at 2.16 kg and 230° C.

13. The molding material of claim 8 wherein A) is the partly aromatic copolyamide of claim 6.

14. The molding material of claim 8 wherein A) is the partly aromatic copolyamide of claim 7.

15. The molding material of claim 9 wherein A) is the partly aromatic copolyamide of claim 6.

16. The molding material of claim 10 wherein A) is the partly aromatic copolyamide of claim 6.

17. The molding material of claim 11 wherein A) is the partly aromatic copolyamide of claim 6.

18. The molding material of claim 12 wherein A) is the partly aromatic copolyamide of claim 6.

19. The thermoplastic molding material of claim 1 wherein the partly aromatic copolyamide A has a crystallinity of greater than 30%.

* * * * *

UNITED STATES PATENT AND TRADEMARK OFFICE
CERTIFICATE OF CORRECTION

PATENT NO.: 5,783,634

DATED: July 21, 1998

INVENTOR(S): WEBER et al.

It is certified that error appears in the above-identified patent and that said Letters Patent is hereby corrected as shown below:

On the cover page, insert the following foreign application priority data:

--[30]   Foreign Application Priority Data
 Apr. 22, 1995   [DE]   Germany ................. 195 14 904.1--.

Signed and Sealed this

Eighth Day of June, 1999

*Attest:*

Q. TODD DICKINSON

*Attesting Officer*    *Acting Commissioner of Patents and Trademarks*